Nov. 28, 1944.    R. G. SOLHEIM    2,363,756
PIPE HANGER PRESS
Filed Sept. 14, 1943    5 Sheets-Sheet 1
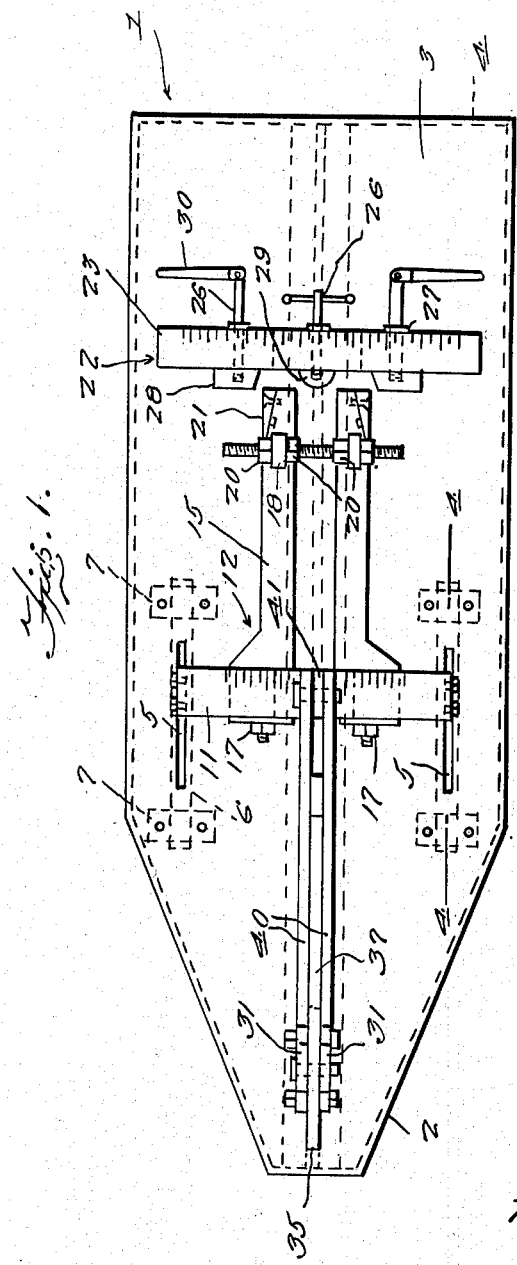
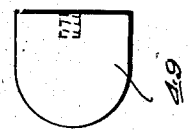
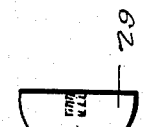
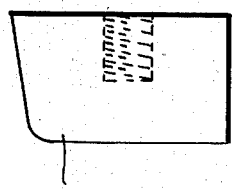
Inventor
Russell G. Solheim
By Clarence A. O'Brien
and Harvey B. Jacobson
Attorneys

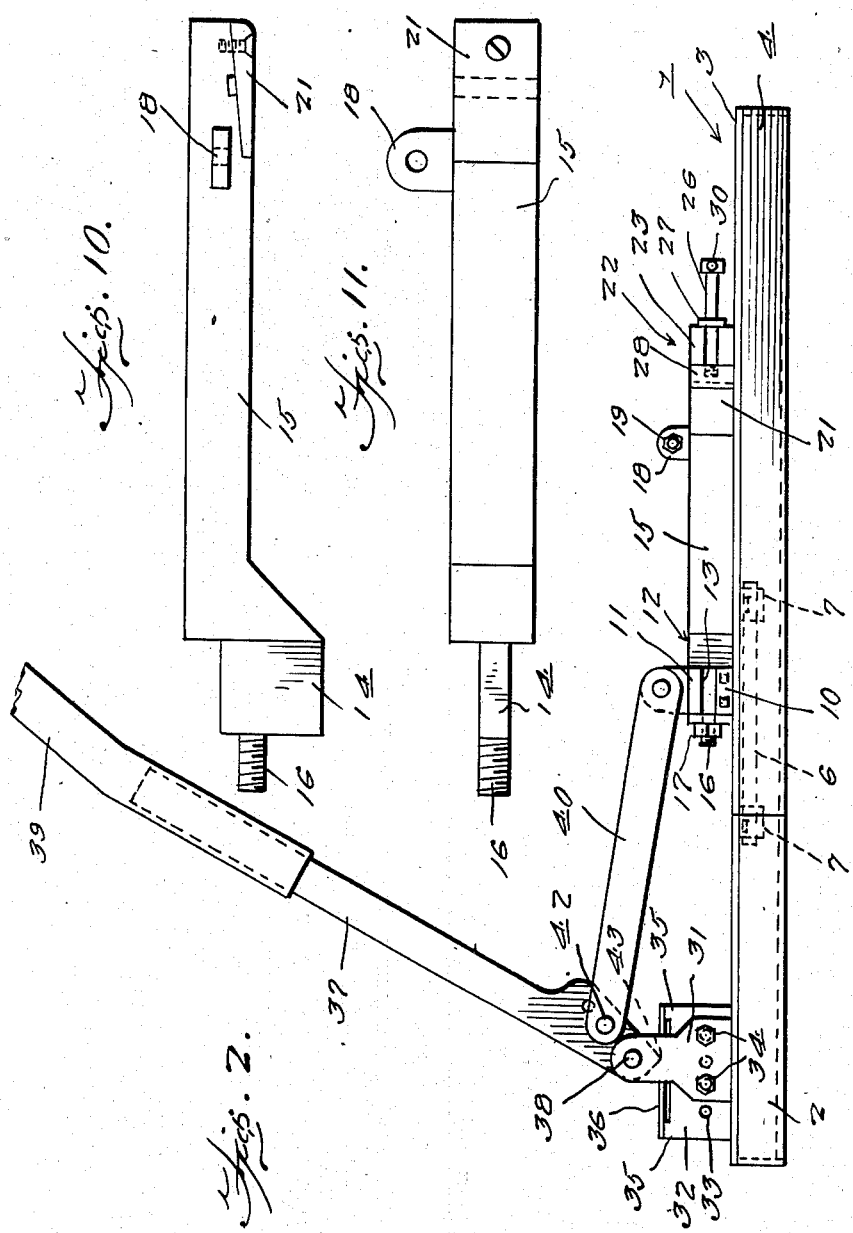

Nov. 28, 1944.   R. G. SOLHEIM   2,363,756
PIPE HANGER PRESS
Filed Sept. 14, 1943   5 Sheets-Sheet 3
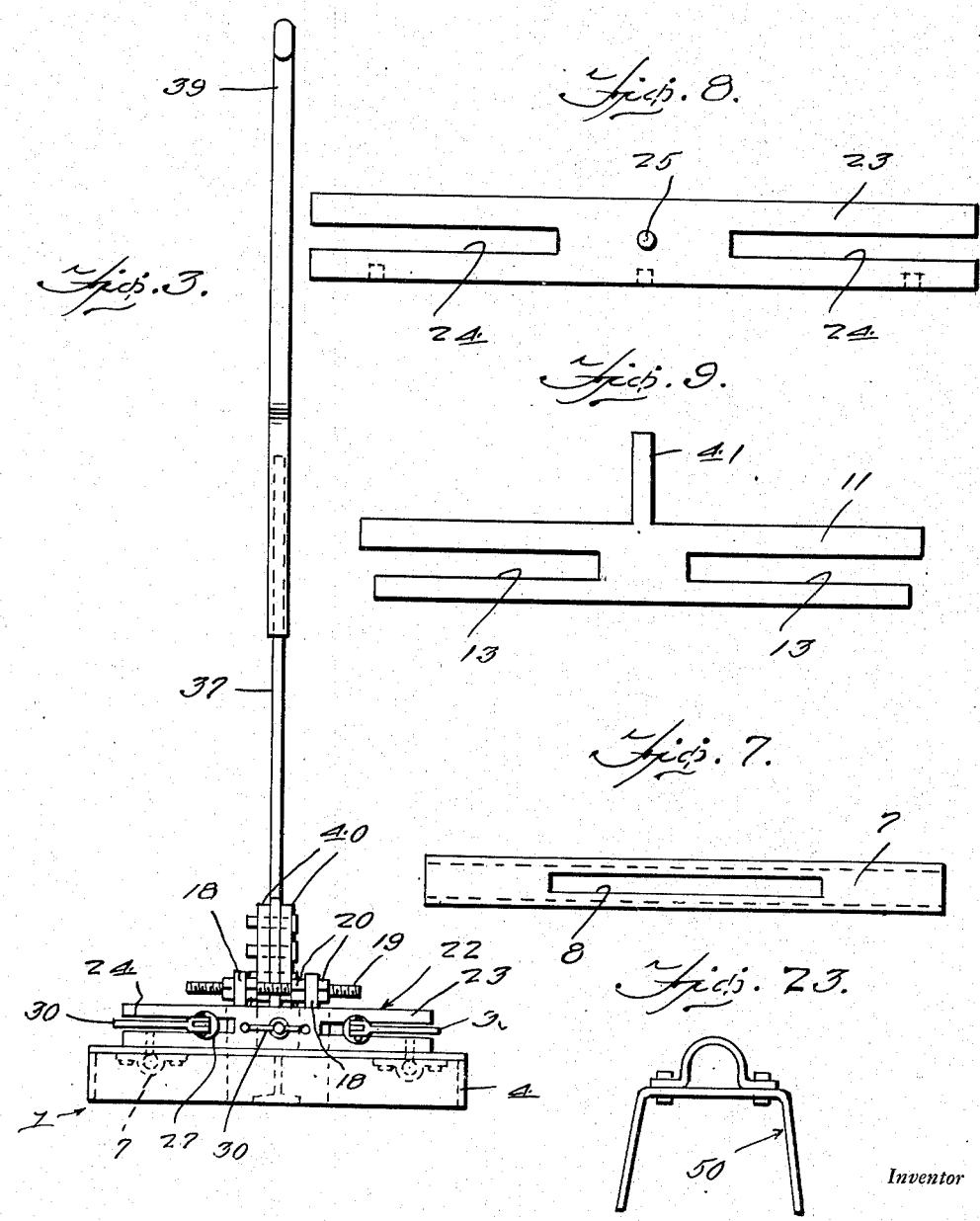

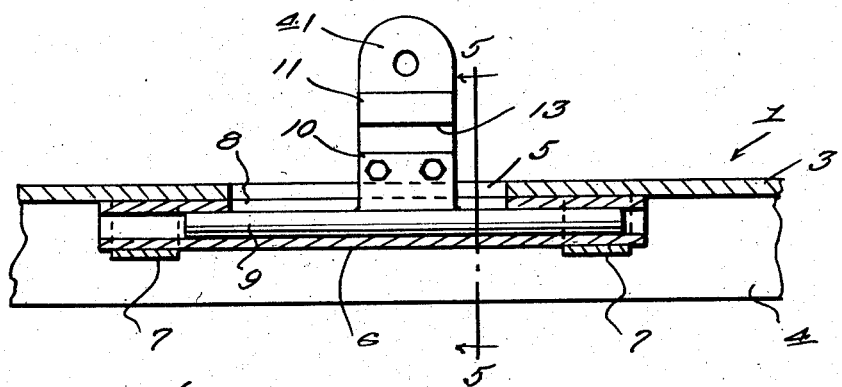
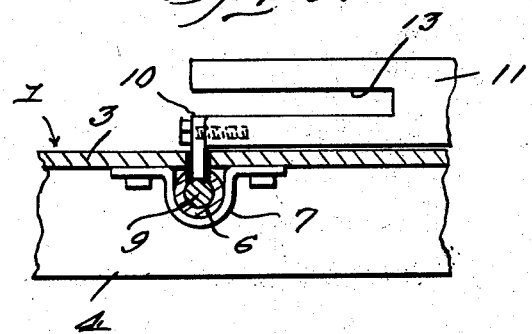
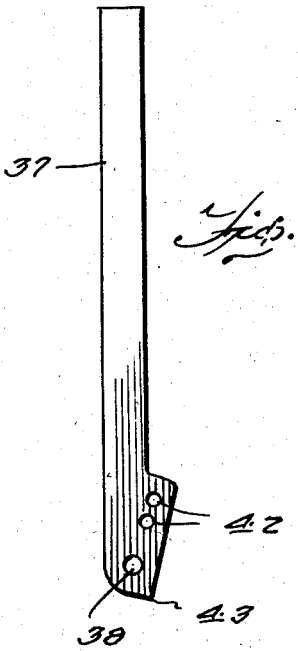
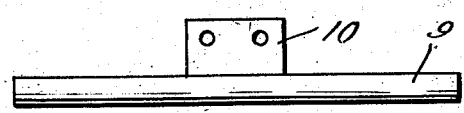
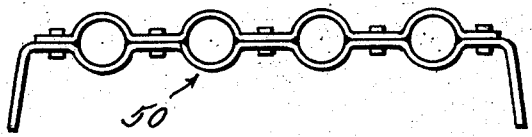

Nov. 28, 1944.  R. G. SOLHEIM  2,363,756
PIPE HANGER PRESS
Filed Sept. 14, 1943  5 Sheets-Sheet 5
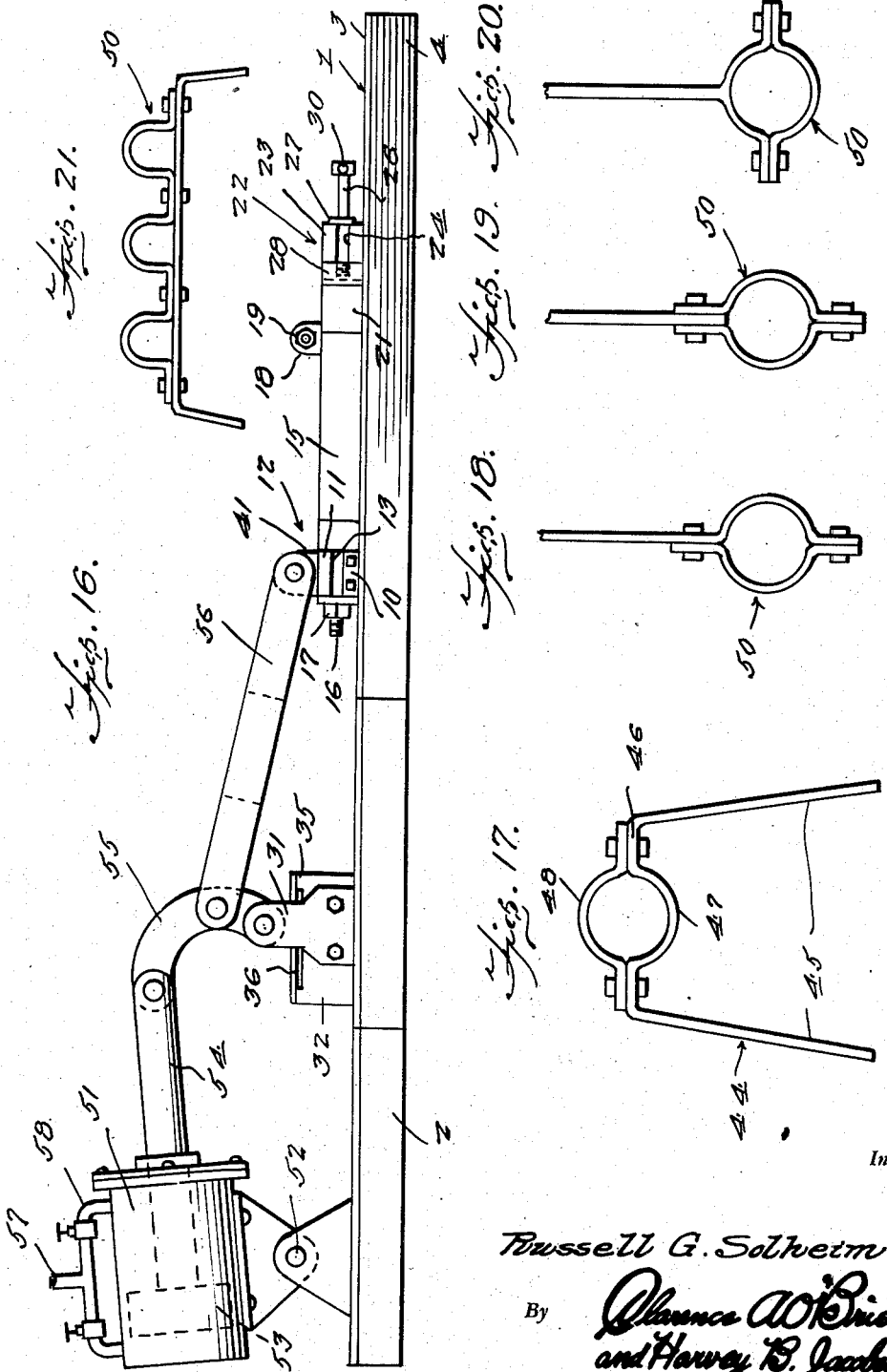

Patented Nov. 28, 1944

2,363,756

UNITED STATES PATENT OFFICE 2,363,756

PIPE HANGER PRESS

Russell G. Solheim, Sawyer, Wis.

Application September 14, 1943, Serial No. 502,330

3 Claims. (Cl. 153—48)

The present invention relates to new and useful improvements in pipe hanger presses, and has for one of its important objects to provide, in a manner as hereinafter set forth, a device of this character comprising a unique construction, combination and arrangement whereby the several bends in hangers of this character may be expeditiously made in a single operation.

Another very important object of the invention is to provide a press of the aforementioned character which may be readily adjusted to produce various sizes and types of pipe hangers.

Other objects of the invention are to provide a pipe hanger press of the character described which will be comparatively simple in construction, strong, durable, highly efficient and reliable in use, compact, and which may be manufactured at low cost.

All of the foregoing, and still further objects and advantages of the invention will become apparent from a study of the following specification, taken in connection with the accompanying drawings wherein like characters of reference designate corresponding parts throughout the several views, and wherein:

Figure 1 is a top plan view of a pipe hanger press constructed in accordance with the present invention.

Figure 2 is a view in side elevation of the device.

Figure 3 is an end elevational view.

Figure 4 is a fragmentary view in longitudinal section, taken substantially on the line 4—4 of Figure 1.

Figure 5 is a fragmentary view in cross section, taken substantially on the line 5—5 of Figure 4.

Figure 6 is a detail view in side elevation of one of the slidable die supporting rods or runners.

Figure 7 is a detail view in top plan of one of the tubular runner guides.

Figure 8 is a detail view in elevation of the cross bar of the female die.

Figure 9 is a detail view in elevation of the cross bar of the male die.

Figure 10 is a top plan view of one of the plungers of the male die.

Figure 11 is a view in side elevation of one of the male die plungers.

Figure 12 is a detail view in side elevation of the operating lever.

Figures 13, 14 and 15 are detail views in eletion of several female die blocks.

Figure 16 is a view in side elevation of a modification, wherein the device is pneumatically actuated.

Figures 17 to 23, inclusive, are views illustrating different types and sizes of pipe hangers which may be made with the device.

Referring now to the drawings in detail, it will be seen that reference character 1 designates generally an elongated metallic base of suitable dimensions. The base 1 includes a tapered end portion 2. The base 1 further comprises a plate 3 which is supported by a depending marginal skirt or flange 4.

At an intermediate point, the plate 3 of the base 1 has formed longitudinally therein a pair of parallel slots 5. Tubular guides 6 are mounted longitudinally beneath the plate 5 through the medium of straps 7, said tubular guides having longitudinal slots 8 therein which are aligned with the slots 5.

Runners 9 in the form of metallic rods are slidably mounted in the guides 6. Rising from the runners 9 at an intermediate point are metallic brackets 10 which are operable in the slots 5 and 8. The transverse, graduated bar 11 of a male die assembly 12 is secured between the brackets 10. As best seen in Figure 9 of the drawings, the bar 11 has extending thereinto from the ends thereof slots 13. The slots 13 adjustably receive ears 14 on one end of the plungers 15 which project forwardly from the bar 11. Shanks 16 project from the ears 14 and have threaded thereon nuts 17 which secure the plungers 15 in adjusted position on the bar 11.

Apertured lugs 18 rise from the forward end portions of the plungers 15. A threaded rod 19 extends slidably through the lugs 18. Nuts 20 are provided on the rod 19 for adjusting the plungers 15 laterally. The plungers 15 further include removable enlarging plates 21 on their forward end portions.

A female die assembly 22 on the plate 3 is cooperable with the male die assembly 12. The assembly 22 includes a transverse, graduated bar 23 which is fixed on the plate 3. The bar 23 has extending thereinto from the ends thereof slots 24. Intermediate the slots 24, the bar 23 is further provided with an opening 25. The slots 24 and the opening 25 accommodate hand screws 26 having stop collars 27 thereon which are engaged with the bar 23. Blocks 28 are threadedly mounted on the outermost screws 26. A substantially segmental block 29 is threadedly mounted on the intermediate screw 26. Suitable operating means 30 is provided for the screws 26. The screws 26 constitute means for frictionally clamping the elements 28 and 29 against the bar 23. The outermost screws 26 are adjustable in the slots 24.

Mounted on the end portion 2 of the base 1 is a pair of upstanding, spaced brackets 31. A vertical plate 32 is adjustably mounted between the brackets 31. The plate 32 has longitudinally spaced openings 33 therein in which bolts 34 are insertible for securing said plate in adjusted position. Integral lugs 35 rise from the end portions of the plate 32. Extending between the lugs 35 is a resilient bar 36 the purpose of which will be presently set forth.

A hand lever 37 has one end portion pivotally secured at 38 between the upper portions of the brackets 31. The lever 37 includes a removable handle 39. Toggle links 40 operatively connect the lever 37 to the male die assembly 12. The toggle links 40 have one end portion pivotally connected to an upstanding apertured ear 41 on the bar 11. The other end portions of the toggle links 40 are adjustably and pivotally connected at 42 to the lever 37 at a point adjacent the pivot 38. The pivoted end portion of the lever 37 includes a cam 43 which is operable on the resilient bar 36 and which, in conjunction therewith, constitutes means for securing said lever in its raised or lowered position.

It is thought that the operation of the device will be readily apparent from a consideration of the foregoing. Briefly, with the dies 12 and 22 assembled, as seen in Figure 1 of the drawings, a hanger 44 of the type illustrated in Figure 17 may be produced. It will be observed that the hanger 44 includes a pair of oppositely inclined legs 45 with a connecting bar 46 on one end, said connecting bar 46 including a substantially semi-circular intermediate portion 47 for the reception of the pipe. The stock in the form of a bar of suitable metal is placed transversely across the base 1 between the die assemblies 12 and 22. The lever 37 is then swung downwardly for actuating the plungers 15. The construction and arrangement is such that the plungers 15 and the blocks 28 bend the legs 45 of the hanger 44 and at the same time the block 29, in conjunction with the plungers 15, forms the portion 47 of said hanger. By removing or rendering inoperative the outer blocks 28 of the assembly 22, the clamps 48 of the hanger may also be formed on the device. By using different sizes and types of blocks 28 and 29 and adjusting them as may be required, also by adjusting the plungers 15 on the bar 11, various types and sizes of hangers may be produced. In Figure 15 of the drawings, reference character 49 designates one of the intermediate blocks which may be used in the female die assembly 22 in lieu of the member 29. In Figures 18 to 23, inclusive, of the drawings, reference character 50 designates generally different types and sizes of single and multiple hangers which may be produced by simply changing and adjusting the male and female die assemblies 12 and 22, respectively.

In the modification illustrated in Figure 16 of the drawings, an air cylinder 51 is rockably mounted at 52 on the end portion 2 of the base 1. A piston 53 is mounted for reciprocation in the cylinder 51 on one end of a rod 54. The other end of the piston rod 54 is pivotally connected to a short, arcuate lever 55 which is mounted for swinging movement on the brackets 31. A toggle link 56 operatively connects the lever 55 to the male die assembly 12. In other respects, this form of the invention is substantially similar in construction and operation to the embodiment of Figure 1. The cylinder 51 receives air under pressure from any suitable source through a pipe 57 and a manifold 58. Any suitable means may be utilized for controlling the air to the cylinder 51.

It is believed that the many advantages of a pipe hanger press constructed in accordance with the present invention will be readily understood, and although preferred embodiments of the device are as illustrated and described, it is to be understood that further modifications and changes in the details of construction may be resorted to which will fall within the scope of the invention as claimed.

What is claimed is:

1. A pipe hanger press comprising a base, a stationary bar mounted on the base, said stationary bar having longitudinal slots therein, screws rotatable and adjustable in the slots, blocks mounted on said screws, means for turning the screws, a movable bar on the base having longitudinal slots therein, a plurality of parallel plungers adjustably mounted in the slots of the movable bar, means for adjusting the plungers toward and away from each other, said plungers being cooperable with the blocks, and means on the base for actuating the movable bar and the plungers toward and away from the stationary bar.

2. A pipe hanger press comprising a base having parallel slots therein, a female die assembly mounted on the base, tubular guides mounted beneath the base and having slots therein aligned with the first-named slots, runners slidable in the guides, brackets on the runners operable in the slots, a bar mounted between said brackets, plungers projecting from the bar and cooperable with the female die assembly, and means on the base for actuating the plungers toward and away from the female die assembly.

3. A pipe hanger press comprising a base, a stationary female die assembly mounted on said base, a male die assembly shiftably mounted on the base and movable toward and away from the female die assembly and cooperable therewith, a pair of brackets mounted on the base, a resilient bar mounted horizontally between said brackets, a hand lever having one end portion pivotally secured between the brackets, toggle links operatively connecting said lever to the male die assembly, and a cam on the pivoted end portion of the lever operable on the resilient bar for yieldingly securing the lever against swinging movement.

RUSSELL G. SOLHEIM.